United States Patent [19]
Klammer

[11] Patent Number: 5,961,128
[45] Date of Patent: Oct. 5, 1999

[54] EXPANSION SEAL

[75] Inventor: Hans-Peter Klammer, Hausach, Germany

[73] Assignee: Umformtechnik Hausach GmbH, Germany

[21] Appl. No.: 08/965,804

[22] Filed: Nov. 7, 1997

[30] Foreign Application Priority Data

Nov. 7, 1996 [DE] Germany ............................ 196 45 904

[51] Int. Cl.$^6$ ...................................................... F16J 15/46
[52] U.S. Cl. ........................ 277/646; 277/652; 277/946; 277/640
[58] Field of Search ..................................... 277/646, 650, 277/652, 605, 642, 641, 640, 637, 946, 944, 616, 625

[56] References Cited

U.S. PATENT DOCUMENTS

| | | | |
|---|---|---|---|
| 1,674,277 | 6/1928 | Dennis | 277/646 |
| 2,774,621 | 2/1956 | Kilbourne | 288/23 |
| 3,360,273 | 12/1967 | Hundt et al. | 277/605 |
| 4,373,377 | 2/1983 | Smith et al. | |
| 4,915,355 | 4/1990 | Fort | 277/946 |
| 5,114,054 | 5/1992 | Watson. | |
| 5,170,320 | 12/1992 | Pease | 277/642 |
| 5,476,268 | 12/1995 | Rinne | 277/646 |
| 5,494,301 | 2/1996 | Hamilton et al. | 277/946 |

FOREIGN PATENT DOCUMENTS

| | | | |
|---|---|---|---|
| 37 29 181 A1 | 3/1988 | Germany | B60R 13/06 |
| 37 39 176.3 A1 | 5/1988 | Germany | E06B 7/22 |
| 42 21 647 A1 | 1/1994 | Germany. | |
| 44 40 895 C1 | 5/1996 | Germany | F16J 15/46 |
| 705093 | 3/1954 | United Kingdom. | |
| 2 067 637 | 7/1981 | United Kingdom. | |

Primary Examiner—Chuck Y. Mah
Assistant Examiner—Alison K. Pickard
Attorney, Agent, or Firm—Pendorf & Cutliff

[57] ABSTRACT

Expansion seal ring with an essentially torus shaped expansion seal (1) which is provided between two concentric positionable connection pieces (2, 3) to be sealed or the like, which include a sealing section (1a) which is pulled over the edge (3a) of one of the two connection pieces (3), and which includes an expandable section (1b), which is provided to be radially effective between the two connection pieces (2, 3), as well as a jacket (4) which essentially completely covers or envelopes the expansion seal (1) at least in the area of the expandable section (1b).

12 Claims, 2 Drawing Sheets

EXPANSION SEAL

BACKGROUND OF THE INVENTION

The present invention concerns an expansion seal ring as well as a process for manufacture of such an expansion seal ring.

Expansion seals, also in the form of expansion seal rings, have in principal been known for a long period of time.

DESCRIPTION OF THE RELATED ART

Examples of their employment in motor vehicles are described in DE 37 39 176 A1 or DE 37 28 181 A1. DE 37 39 176 A1 shows a sealing strip for a motor vehicle door, which is secured to a rim or, as the case may be, a flange of the automobile body by means of a U-shaped clamp in the area of the door opening. The expansion seal further includes a hose-like sealing part, which is made of plastic or rubber and which is expanded by air pressure supplied to it and which can be brought into sealing contact with the closed motor vehicle door.

A similarly constructed sealing device is described in DE3729181, which is employed in combination with a sliding roof of a motor vehicle. The expansion seal is securely adhered via an attachment section to an angle shaped rim of the roof section. The hose-like sealing section is directed against the circumference of the slidable lid which closes the roof opening and can be placed under pressure for improving the sealing effect.

These expansion seals made of elastically yieldable plastic or rubber are entirely suitable for the indicated application in the environment of motor vehicles. A use in an environment, in which a contact with chemically aggressive media is unavoidable, would fail due to the lack of resistance of the sealing materials. Conventional sealing elements of elastomeric materials are employed, which continue to be overcoated with chemically resistive coatings, for example of PTFE. In a case of the flexible coating or cover as known from U.S. Pat. No. 2,774,621, the sealing body made of silicone or similar materials is overcoated with a layer of PTFE, PVC or the like material by dipping in a appropriate dispersion or solution and subsequent curing.

In the valve-seal as known from U.S. Pat. No. 4,915,355, an O-ring is protected by an abutment envelope of PTFE which is fixed via a clamp collar or locking ring in a notch, which also receives the O-ring.

A disadvantage of the above described sealing elements is, that although these are made resistant to chemical influences by their coating, they however allow no deformation in that amount, which would be required of expansion seals.

It is further known from GB 705093 to employ sealing elements in automobile construction, which include a hollow chamber and therewith permit a deformation in greater circumference. For protection particularly against the effects of heat, the sealing element is jacketed with a fabric, which additionally is drawn over the rim of one of the automobile side bars and thereto is fixed.

A special suitability or usability of this conception for the manufacture of an expansion seal ring cannot be understood therefrom, since the fabric inherently includes interstitial spaces between the fabric threads, through which particles of the aggressive media penetrate and can have an effect upon the sealing material.

Finally, from DE 44 40 895 C1 there is known a coupling connection between two connectable tube or pipe coupling pieces, in which an inflatable sealing ring is seated in a circumscribing ring notch of a connection flange. For protection against aggressive media an elastic cuff is provided, which axially completely covers over the flange and therewith the therein seated sealing ring. This type of sealing is, however, only effective in the axial direction and in association with the here discussed flange connection. Radial sealing forces cannot be achieved hereby.

SUMMARY OF THE INVENTION

The present invention is thus concerned with the task of providing an expansion seal ring which can be provided between two concentrically positionable connection pieces adapted to be brought into sealing engagement, or the like, and therewith is radially effective, and which via a jacket is rendered chemically resistant with respect to aggressive media. The expansion seal ring should be simple in construction and therewith economical in production.

The invention is based upon the idea, of providing an essentially torroidal shaped expansion seal, which is provided between two concentrically positionable connection pieces which are to be sealed. The expansion seal includes an attachment segment which is drawn over one rim of one of the two closure pieces, as well as an inflatable segment, which is effective radially between the two closure pieces. At least in this area the expansion seal is essentially completely covered by a jacket, so that the desired protection against aggressive media is achieved. Such an expansion seal ring is economical to produce and can be mounted by simple seating on the rim of one or both closure pieces. The combination of the expansion seal and jacket were until now not considered practically realizable, since the materials which have been used as jacket layers for seals, in particular polytetrafluorolethylene (PTFE), have been used in association with seals in which the deformation was comparatively minimal. A translation to expansion seals thus appeared not to be achievable on the basis of the insufficient elasticity. The inventive solution in the form of a jacket which loosely encompasses the expansion seal in the area of the inflatable section presents a completely new concept of the expansion seal ring, which has no previous counterpart in the state of the art.

Preferably the jacket is made of a stretchable soft PTFE, so that the jacket beginning with a flat structure, such as for example a fabric a foil, can be drawn around the expansion seal and therewith be brought into the necessary shape.

DETAILED DESCRIPTION OF THE INVENTION

It is preferred that the jacket be formed of a circular or annular shaped cloth or towel, so it can be wrapped around the torus shaped expansion seal by appropriate stretching, without the need for cutting losses at the end. There is also eliminated the otherwise conventional post-working step of cutting off of the unnecessary sections of the starting materials.

Further advantages are seen when a clamping ring is fixed around the edge of one of the connectors of the closure joint. The clamp ring secures those elements of the expansion seal ring which are drawn over the rim of the connection, for example, the radially outward sealing lip of the expansion seal and/or the edges of the jacket, insofar as these are drawn over the rim. When the jacket is annular shaped fabric having inner and outer edges, the outer edge of the fabric can be spanned over the rim of the connector, the expansion seal can then be seated upon this and over the rim, whereby the fabric in the rim area is held securely clamped by the seated expansion seal. Then, the original internally lying inner edge of the fabric is drawn over the seated expansion seal towards the outside and the clamping ring is tensioned over the rim of the connector. This clamping ring holds the expansion seal ring securely at the edge of the connector, thus providing a supplemental securing effect.

Preferably, a connection for pressurized air is provided at the expansion seal, so that the pressurized air available as a rule at the area of use can be utilized to quickly establish the sealing effect. The employment of supplemental air pumps or the like can thus be dispensed with.

Preferably the pressurized air attachment is introduced to the expansion ring in the radial direction, whereby a good accessibility is achieved.

This type of expansion seal ring can be produced in a particularly simple manner, when a circular ring shaped fabric is employed as the jacket having an inner edge and an outer edge. The outer edge of this fabric is then tensioned over the rim of the connector and is then prefixed thereby for a further processing. The expansion seal is then seated with its radially outer section seated upon the cloth deflecting the cloth downwardly. Subsequently, the internally lying edge area of the cloth is drawn out over the expansion seal and then is tensioned over the edge. Therewith, the expansion seal ring is completely jacketed and protected, at least in the area of potential contact with the aggressive media.

Depending upon conditions and mechanical requirements, the jacket and expansion seal can be fixed with a clamp ring, which is secured to the rim. The clamp ring can be designed to clamp axially downward and radially inward against the rim of the connector and therewith fixes the component parts of the expansion seal ring.

With respect to further characteristics and advantages of the inventive expansion seal ring or, as the case may be, the process for manufacture of such expansion seal ring, reference is made to the following description.

BRIEF DESCRIPTION OF THE DRAWINGS

In the drawings there is shown:

In FIG. 1 a lower part or section (connector) of a discharge funnel of a container for, for example, flowable goods is indicated with reference numeral 2. In the lower part of FIG. 1, there is indicated with reference numeral 3 the upper rim of a connector or coupling section of a corresponding emptying station.

Figure 1:
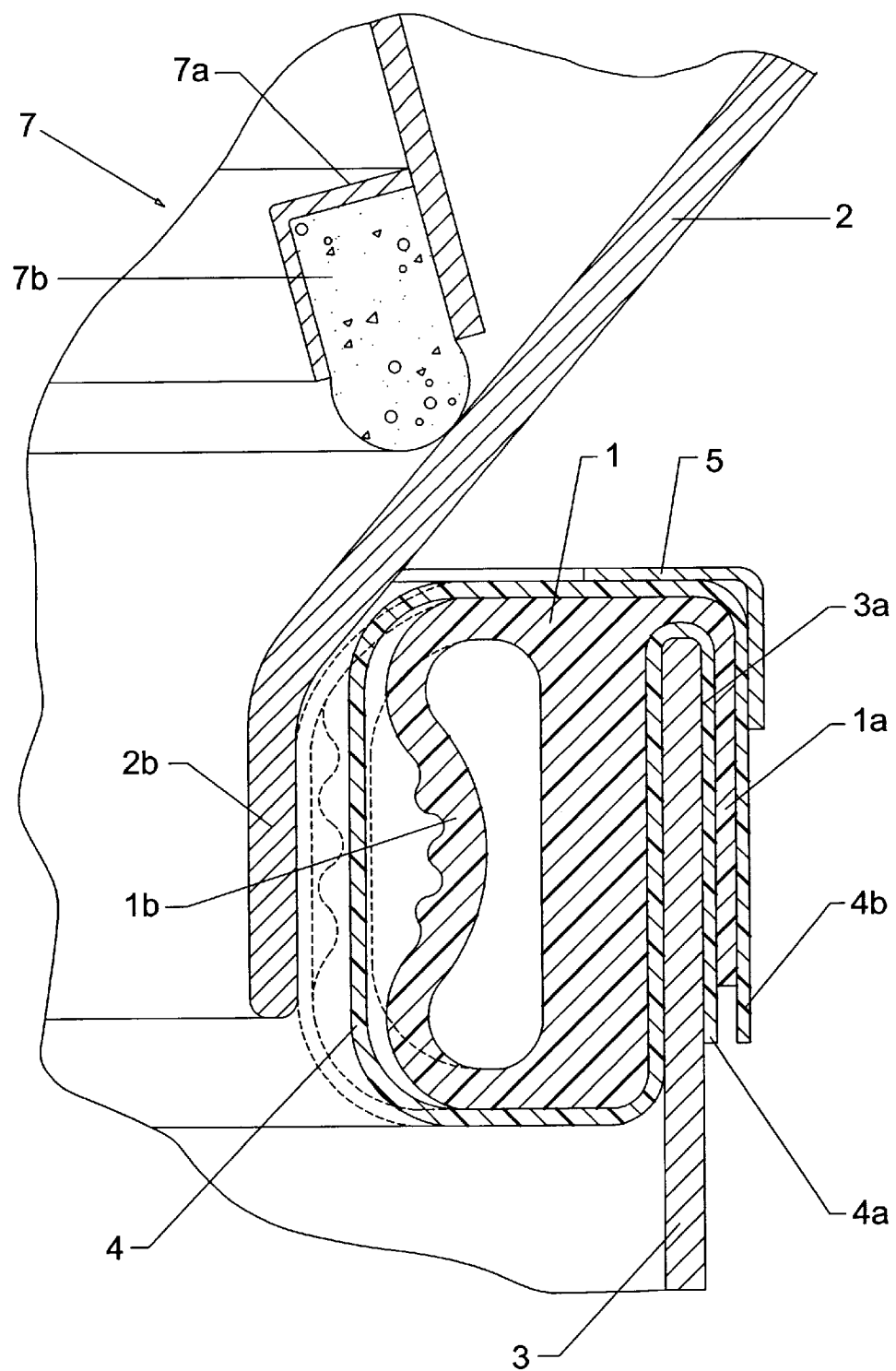
FIG. 1 A partial cross-section view of an expansion seal ring according to the invention, which is provided between two connections.

In the case of an emptying of the container for flowable materials, the connector 2 must be positioned over the connector 3 and subsequently be lowered or seated. The concentric introduction of the connector 2 of the container for flowable material relative to the connector 3 of the emptying station is accomplished by means of a guided seating of the discharge funnel in the capture shoe (not shown) of the emptying station.

In order that a tight, in particular, dust tight, seal between the two connectors 2 and 3 is achieved, there is provided between these two concentric connections 2 and 3 or as the case may be rims 2a and 3a an expansion seal ring.

For emptying of the container for the flowable materials a conical closure plug 7 is lifted within the discharge funnel. The conical closure plug 7 includes therein a seal holder ring 7a as well as a seal 7b.

The expansion seal ring according to the present invention is provided operatively radially effective essentially between the two connectors 2 and 3, and in particular between the rims 2a and 3a.

The expansion seal ring shown in the embodiment is provided with a jacket 4 of soft PTFE (teflon). Such a jacketing protects the expansion seal 1 which preferably is made of silicone, from aggressive medium.

Beginning with a sheet or a fabric of soft PTFE, the jacket 4 which annularly has for example with an outer cross-section of 745 mm and an inner cross-section of 15 mm, is drawn or pulled with the outer lying edge areas 4a over the upper edge 3a of the connector 3. After the drawing or stretching of the jacket 4, the expansion seal 1 is seated upon the rim 3a, so that a radial outer lying section 1a of the expansion seal 1 is provided on the outer side of the rim 3a of the connector 3 and the outer edge area 4a of the jacket 4 lies or, as the case may be, is clamped between the rim 3a and the section 1a.

Subsequently, the inner cross-section of the jacket 4 is expanded to approximately 485 mm and then drawn over the expansion seal 1 radially towards the outside over the rim 3a.

For fixing of the jacket 4 and the expansion seal 1 to the rim 3a of the connector 3 of the emptying station, a collar or clamp ring 5 is provided, which is so seated over the upper edge 3a of the connector 3, so that the two edge areas 4a and 4b of the jacket 4 as well as the radial outwardly lying section 1a of the expansion seal 1 are clamped and therewith made secure between the collar ring 5 and the rim 3a.

A connection 6 for compressed air is provided at the expansion seal 1, wherein in the figures the unpressurized condition of the expansion seal 1 is represented by means of solid lines, while the pressurized condition (without consideration of the shape of the connector 2) of the expansion seal 1 is shown by dashed lines.

Figure 2:
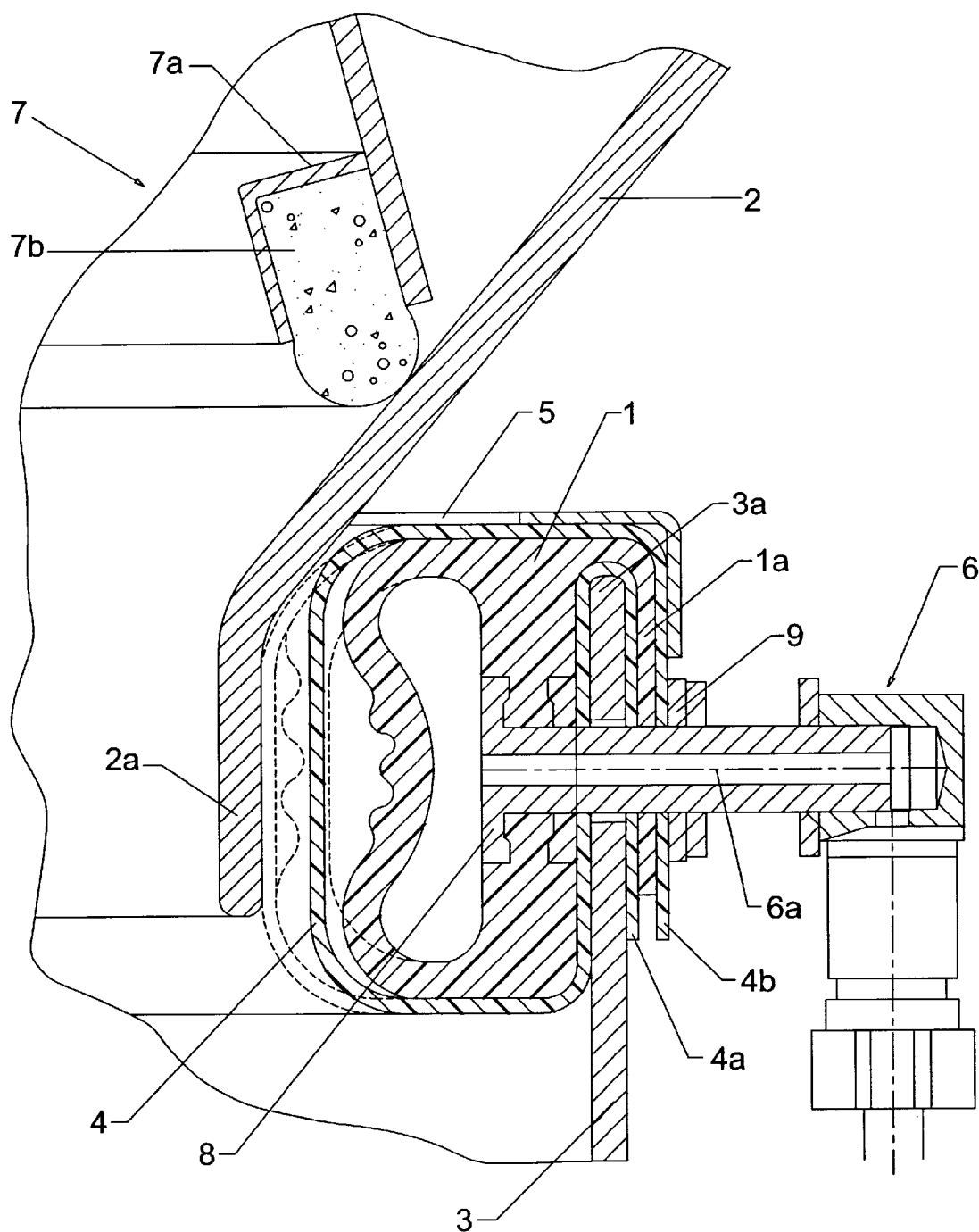
FIG. 2 A partial cross-sectional view of the expansion seal ring according to FIG. 1, however, with a compressed air connection.

The compressed air attachment 6 comprises essentially and in the FIG. 2 horizontally extending introductory conduit 6a, which from outside towards inside penetrates first in the edge area 4b of the jacket 4, the section 1a of the expansion seal 1, the rim area 4a of the jacket 4, the edge 3a of the connector 3 as well as the expansion seal 1. Through this supply line 6a the compressed air is introduced into the expansion seal 1, which then thereby expands and completely and sealingly fills up the interstitial space between the rims 2a and 3a of the connection pieces 2 and 3.

For securing of the supply line 6a to the rim 3a of the connection piece 3, the outer circumference of the supply line 6a is provided with an outer threading, upon which a screw 9 can be so screwed upon, that a projection 8 of the supply conduit 6a provided within the expansion seal 1 serves as an abutment or support and permits the fixing of the supply conduit 6a to the rim 3a of the connection piece 3.

The design of the expansion seal 1 in the area between the rims 2a and 3a of the connection pieces 2 and 3 to be sealed is primarily right-angled. On the side of the expansion seal 1, which is expanded by the introduction of compressed air, the expansion seal is slightly bowed-in (see FIGS. 1 and 2, left) and on the outer side with a structured outer surface of the edge area to be sealed. In the indicated embodiment, the outer shape is shown wavy or corrugated, that is, thicker and thinner sections are alternatively provided.

In the illustrated embodiment, the expansion seal is essentially designed or constructed substantially torroidally shaped, that is, the expandable section does not possess an exact circular cross-section, as this is conventionally understood for a strict definition of a torus. In the present case, the exact design of the cross-section for attainment of the securing effect is, however, not limited, so that under this general concept, just like the circular shapes, similar geometries can be substituted such as, for example, quadratic, right-angled, or also D-shaped cross-sectional shapes.

A similar expansion seal ring with respect to the function can principally also be realized on the radially inner lying connector 2, wherein then the circular shaped fabric is first laid with its radial inner lying section over the rim 2a of the connection piece 2 and the outer lying edge area folded back towards inwards over the expansion seal.

What is claimed is:

1. Expansion seal ring for sealing between two concentric positionable connectors (2, 3) each having a rim defining an opening (2a, 3a), said expansion seal ring comprising:
   an essentially torus shaped expansion seal (1) dimensioned for introduction between first and second concentric positionable connectors (2,3) to be sealed, said expansion seal (1) including an expansion seal radially outer sealing lip (1a) dimensioned and adapted to be drawn over and seated on said rim (3a) of said first connector (3), which said expansion seal (1) includes a radially expandable section (1b), and
   a jacket adapted to essentially completely envelope the expansion seal (1) at least in the area of the expansion seal radially expandable section (1b).

2. Expansion seal ring according to claim 1, wherein said jacket (4) is made of stretchable soft polytetrafluoroethylene.

3. Expansion seal ring according to claim 1, wherein said jacket (4) is formed of an annular shaped material.

4. Expansion seal ring according to claim 3, wherein said jacket has an inner edge (4b) and an outer edge (4a), and wherein said outer edge (4a) is adapted to be drawn over the rim of said first connector, and wherein said jacket is dimensioned such that the expansion seal (1) can be seated thereover upon the rim (3a) of said first connector, and thereafter the inner edge of said jacket (4b) can be drawn over the expansion seal (1) seated on said rim (3a) of said first connector and be tensioned over the rim (3a) of said first connector.

5. Expansion seal ring according to claim 1, further including a collar ring (5) for the form-fitting securing of at least one of the expansion seal (1) and the jacket (4) to said rim (3a) of said first connector (3).

6. Expansion seal ring according to claim 1, wherein the expansion seal (1) is made of silicone.

7. Expansion seal ring according to claim 1, wherein the expansion seal (1) is provided with a connection (6) for compressed air.

8. Expansion seal ring according to claim 7, wherein said compressed air connection (6) has a central axis oriented radially to said expansion seal (1).

9. Expansion seal ring for sealing between two concentric positionable connectors (2, 3), said expansion seal ring comprising:
   an expansion seal (1) including
      (a) an essentially torus shaped radially expandable section, and
      (b) an expansion seal radially outer sealing lip (1a) defining a recess between said lip and said radially expandable section, and
   a jacket (4) covering at least the radially expandable section (1b) of the expansion seal (1).

10. Expansion seal in claim 9, wherein said jacket is made of polytetrafluoroethylene.

11. Process providing an expansion seal capable of sealing between a first and a second concentric positionable connectors (2, 3) each of which having a rim defining an opening, and comprising:
   (a) obtaining an annular ring shaped jacket (4) having an outer edge and an inner edge;
   (b) tensioning the outer edge of the jacket (4) over the rim (3a) of said first connector (3),
   (c) obtaining an expansion seal (1) including an essentially torus shaped radially expandable section (1b) and an expansion seal radially outer sealing lip (1a), said expansion seal (1) having a recess defined between said lip and said radially expandable section, said recess dimensioned for engagement with said rim (3a) of said first connector (3),
   (d) seating said expansion seal (1) such that said tensioned outer edge of said jacket (4) and said rim (3a) of said first connector (3) are introduced into said expansion seal recess, and
   (e) drawing said inner edge (4b) of said jacket (4) outwardly over the expansion seal (1) and over the connector rim (3a) to essentially completely envelope the expansion seal (1) at least in the area of the radially expandable section (1b).

12. Process according to claim 11, further comprising securing the jacket (4) and the expansion seal (1) to said rim (3a) of said first connector (3) with a collar ring (5).

* * * * *